United States Patent
Rhee et al.

(10) Patent No.: US 9,868,226 B2
(45) Date of Patent: Jan. 16, 2018

(54) STONE CUTTING DEVICE

(71) Applicant: EHWA DIAMOND IND. CO., LTD., Gyeonggi-do (KR)

(72) Inventors: Dae-Yeon Rhee, Gyeonggi-do (KR); Nam-Kwang Kim, Chungcheongbuk-do (KR); Doo-Hoe Kim, Chungcheongbuk-do (KR); Hee-Dong Park, Gyeongg-do (KR)

(73) Assignee: EHWA DIAMOND IND. CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/892,659

(22) PCT Filed: Jun. 10, 2014

(86) PCT No.: PCT/KR2014/005083
§ 371 (c)(1),
(2) Date: Nov. 20, 2015

(87) PCT Pub. No.: WO2014/200245
PCT Pub. Date: Dec. 18, 2014

(65) Prior Publication Data
US 2016/0107334 A1    Apr. 21, 2016

(30) Foreign Application Priority Data

Jun. 10, 2013   (KR) .................. 10-2013-0066139

(51) Int. Cl.
*B28D 1/06* (2006.01)
*B23D 51/12* (2006.01)
*B27B 3/38* (2006.01)

(52) U.S. Cl.
CPC ........... *B28D 1/068* (2013.01); *B23D 51/125* (2013.01); *B27B 3/38* (2013.01); *B28D 1/06* (2013.01)

(58) Field of Classification Search
CPC ........ B23D 51/125; B27B 3/38; B28D 1/068; B28D 1/06
See application file for complete search history.

(56) References Cited

U.S. PATENT DOCUMENTS 2,963,018 A * 12/1960 Mattson ............... B23D 61/121
                                                       125/16.01
3,176,675 A *  4/1965 Bomba ................ B23D 59/025
                                                       125/15
(Continued)

FOREIGN PATENT DOCUMENTS

CN          1307518 A       8/2001
KR      10-0582290 B1       5/2006
(Continued)

OTHER PUBLICATIONS

Extended European Search Report for corresponding Patent Application No. 14810155.3 dated May 3, 2016.
(Continued)

*Primary Examiner* — Dung Van Nguyen
(74) *Attorney, Agent, or Firm* — Renner, Otto, Boisselle & Sklar, LLP

(57) ABSTRACT

A stone cutting device configured to cut a workpiece with a plurality of cutting tools by swinging the cutting tools within a predetermined angle range. Each of the cutting tools includes: a blade extending in a length direction of the workpiece; and at least one cutting tip disposed on an end of the blade and protruding from the blade in a width direction of the blade so as to cut the workpiece while being reciprocated in a swinging motion. The stone cutting device includes a frame unit configured to combine and reciprocate the cutting tools and individually adjust tension in each of the cutting tools. The frame unit includes an actuator apply-
(Continued)

ing tension to the cutting tools so as to apply a load of 8 tons to 27 tons to each of the cutting tools.

7 Claims, 10 Drawing Sheets

(56) References Cited

U.S. PATENT DOCUMENTS

| | | | | |
|---|---|---|---|---|
| 3,384,064 | A * | 5/1968 | Miller | B27B 3/36 125/17 |
| 3,662,734 | A * | 5/1972 | Sisler | B23D 51/20 125/16.01 |
| 3,976,045 | A | 8/1976 | Coggins | |
| 4,559,920 | A * | 12/1985 | Toncelli | B28D 1/068 125/17 |
| 5,131,378 | A * | 7/1992 | Marocco | B28D 1/00 125/12 |
| 6,598,597 | B1 | 7/2003 | Marocco et al. | |
| 7,082,939 | B2 * | 8/2006 | Dossena | B28D 1/127 125/15 |
| 7,089,924 | B2 * | 8/2006 | Dossena | B23D 61/121 125/15 |
| 7,637,257 | B2 * | 12/2009 | Jakobuss | B23D 51/025 125/13.01 |
| 2003/0127086 | A1 | 7/2003 | Brauninger et al. | |
| 2004/0112358 | A1 * | 6/2004 | Dossena | B28D 1/127 125/13.01 |
| 2007/0042685 | A1 | 2/2007 | Jakobuss et al. | |
| 2008/0038514 | A1 | 2/2008 | Dossena et al. | |

FOREIGN PATENT DOCUMENTS

| | | |
|---|---|---|
| KR | 10-1072382 B1 | 10/2011 |
| KR | 10-2013-0042888 A | 4/2013 |
| KR | 10-1289859 B1 | 4/2013 |

OTHER PUBLICATIONS

International Search Report for corresponding patent application No. PCT/KR2014/005083 dated Sep. 18, 2014.

* cited by examiner

STONE CUTTING DEVICE

TECHNICAL FIELD

The present disclosure relates to a stone cutting device for cutting brittle workpieces including materials such as stone, bricks, concrete, or asphalt, and more particularly, to a stone cutting device for cutting stone workpieces such as marble workpieces or granite workpieces into slabs.

BACKGROUND ART

In general, stones such as marble and granite are widely used as exterior, interior, or flooring materials in buildings. Such stones are quarried in blocks having a hexahedral shape and are cut into a plurality of slabs.

In the related art, stone cutting devices have been used to cut stone blocks into a plurality of slabs.

Such a stone cutting device includes at least one cutting tool to cut stone, and a frame unit holding the cutting tool and moving the cutting tool relative to the stone for cutting thereof.

Various cutting tools are used according to the shapes or materials of workpieces. For example, a disk-shaped rotating cutting tool may be used to cut a workpiece, or a linear blade-shaped reciprocating cutting tool may be used to cut a workpiece.

An example of a stone cutting device using a linear blade-shaped cutting tool is a frame gang saw.

A frame gang saw, a typical of stone cutting devices of the related art, includes a frame unit and a plurality of blades coupled to the frame unit. While applying tension to each of the blades to maintain the linearity thereof, the frame unit may move in continuously reciprocating motions along the length of a stone block to cut the stone block into slabs.

Such frame gang saws have been widely used for cutting large workpieces such as large blocks of concrete, marble, granite, sandstone, or limestone, into thin slabs.

A common cutting method using a frame gang saw is to cut a workpiece while spraying an abrasive such as granular steel shots onto the frame gang saw.

Recent frame gang saws have included abrasive-containing cutting tips fixed to blades thereof, and techniques for cutting workpieces using such frame gang saws have been developed.

In addition to frame gang saws, other tools such as large circular saw blades, wire saws, or band saws are used for cutting large workpieces.

Large circular saws are disk-shaped, and thus rapid and stable cutting may be guaranteed. Such a large circular saw may include a plurality of blades to simultaneously cut a workpiece into a plurality of slabs. When cutting thick workpieces, a circular saw including large disk-shaped blades may be used. In this case, the thickness of the disk-shaped blades may also have to be increased for the stability of the disk-shaped blades, and thus the size of an overall system may inevitably be increased. This increases the loss of workpieces and manufacturing costs.

In general, wire saws have been widely used for quarrying stones. Recently, wire saws for cutting quarried stone into slabs have been under development. However, processes of cutting stone with a wire saw result in high production costs and a large amount of workpiece loss, and thus applications thereof are limited.

Frame gang saws have been widely used for cutting large blocks of stone without limitations related to the size of workpieces because blades forming the actual cutting parts of frame gang saws can be inserted into workpieces.

Referring to FIGS. 1 to 3B, a cutting tool such as a frame gang saw 10 may include a plurality of blades 12, for example, 250 blades, and each of the blades 12 may have a length of 3 m or more, a thickness of 1.5 mm to 5 mm, and a height of 50 mm to 250 mm.

The frame gang saw 10 may cut a block 1 of granite or marble into slabs, and the slabs may be polished to form finished products such as tiles or blocks. If the thickness deviation of a slab is less than 1.5 mm, the slab is considered to be sufficiently flat. If the thickness deviation of a slab is 2 mm or less, the slab is considered to have an allowable thickness deviation.

When granite or marble is cut using the blades 12, the blades 12 have to be maintained in vertical paths in order to obtain final granite or marble products satisfying the above-mentioned quality requirements.

Referring to FIGS. 3A to 3B, however, when a block 1 is cut with the blades 12, if the blades 12 are twisted or bent because of a force locally applied to the blades 12 in a z-axis direction, the blades 12 may depart from vertical paths (that is, straight paths), and slabs having a thickness deviation outside an allowable range may be produced. In this case, the slabs may be discarded as defective slabs. In addition, due to deformation, the blades 12 may be buckled, broken, worn, or permanently damaged, and thus the effective lifespans of the blades 12 may be shortened.

In a stone cutting device of the related art, tension is applied to both ends of blades of a cutting tool when the cutting tool reciprocates, and thus the stiffness (or linearity) of the blades may be maintained. Furthermore, in the case of a cutting tool using steel shots, blades may be worn by the steel shots, and thus the blades may need to be formed of steel having a high degree of wear resistance. Steel having a high degree of wear resistance may fracture if tension in the steel increases during a cutting process, and thus the degree of tension in the steel is optimally adjusted in consideration of workability. An optimal tensioning force is empirically about 8 tons to 10 tons, though this may vary, according to the kinds of workpieces. In addition, tension has to be uniformly applied to all blades in order to produce slabs satisfying intended dimensions.

Referring to FIG. 4A, in the case of a cutting tool 10 of the related art using steel shots, even in the case that blades 12 depart from their original positions while making contact with a workpiece 1, the blades 12 may easily return to their original positions, for example, by the resilience of the blades 12 because gaps are formed between the blades 12 and the workpiece 1 and thus the blades 12 are not tightly constrained in the workpiece 1. That is, even though a relatively low degree of tension ranging from 8 tons to 10 tons not causing fracturing of the blades 12 may be applied to the blades 12, since the blades are not constrained in the workpiece 1, the blades 12 may not depart from vertical paths during a cutting process.

Referring to FIG. 4B, another exemplary cutting tool 20 of the related art includes cutting tips 24 attached to blades 22.

However, when a workpiece 1 is cut with the cutting tool 20 including the cutting tips 24, the cutting tips 32 are constrained on both sides by the workpiece 1.

In this case, for example, if the cutting tool 20 is impacted and stress is locally formed in the cutting tool 20, the blades 22 may be inclined or bent, and in this state, the blades 22 may cut the workpiece 1.

Therefore, after the workpiece 1 is cut to a certain degree using the inclined or bent blades 22 of the cutting tool 20, since the cutting tips 24 are constrained on both sides by the workpiece 1, the blades 22 may not easily return to their original positions or shapes by the resilience of the blades 22. Therefore, cutting of the workpiece 1 may be continued in a state in which the cutting tips 24 are inclined and constrained by the workpiece 1, and thus the degree of cutting error may increase. That is, if the blades 22 to which the cutting tips 24 are attached are used, stone may be cut at a relatively high speed when compared to a conventional method of cutting stone using an abrasive such as steel shot. However, the blades 22 may easily depart from their positions if tension is applied to the blades 22 within the same range as in the conventional method.

Since the blades 22 of the cutting tool 20 to which the cutting tips 24 are attached are not directly brought into contact with the workpiece 1, the blades 22 may not be worn during a cutting process. Therefore, the wear resistance of the blades 22 may not be a matter of concern, and thus the blades 22 may be formed of high-strength steel resistant to a high degree of tension without fracturing.

Frame gang saws may be broadly classified into two types according to the structure of moving blades of a cutting tool.

One is a type of saw having reciprocating blades in sawing motion, and this type of saw is commonly used to cut stone such as marble.

The other is a type of saw having reciprocally swinging blades, and this type of saw is commonly used to cut stone such as granite, which is harder than marble.

In the case of a sawing-motion reciprocating-type frame gang saw, cutting tips of a cutting tool are continuously in contact with a workpiece during a cutting process. However, in the case of a swing type frame gang saw, blades contact a workpiece about 150 times per minute during a cutting process, and thus the blades may be deformed by impacts.

Therefore, when a swinging type frame gang saw is used to cut a workpiece such as a granite workpiece, blades of the swinging type frame gang saw may be significantly impacted because of the swinging motion thereof, and if cutting tips are attached to lower portions of the blades of the swinging type frame gang saw, the blades may be markedly deformed because the lower portions of the blades are constrained in the workpiece. Therefore, the swing type frame gang saw may require a higher degree of tension than the sawing-motion reciprocating-type frame gang saw or a steel-shot type frame gang saw.

Furthermore, in the case of the above-described cutting tools 10 and 20 of the related art, spacers are used to maintain the shapes of the blades 11 and 22 and gaps between the blades 11 and 22.

Spacers 30 used in a general cutting tool 10 will be described in detail with reference to FIG. 5. In the related art, the spacers 30 are disposed between blades 12 and engaged with the blades 12.

In this case, left and right sides of the blades 12 are constrained by the spacers 30 (in a y-axis direction), and thus tension in the blades 12 is not uniform. That is, since the blades 12 are moved in a state in which the blades 12 are constrained by the spacers 30, tension may not be smoothly applied to the blades 12. That is, tension applied to both ends of the blades 12 may not be properly distributed in the blades 12, and thus the amount of tension in the blades 12 disposed between the spacers 30 may be less than a required amount.

As described above, tension in the blades 12 of the related art may not be properly maintained according to the wear states or required durability of the blades 12. In this case, the durability of the cutting tool 10 and the cutting quality of workpieces may be decreased. Thus, it is required to solve these problems.

A representative related technique is disclosed in Korean Patent No.: 10-1072382 (Oct. 5, 2011).

DISCLOSURE

Technical Problem

An aspect of the present disclosure may provide a stone cutting device including a plurality of cutting tools to which high tension is applicable for improving the quality and rate of cutting. Blades of the cutting tools are not constrained by spacers, and thus tension may be applied to the blades intact and stably maintained in the blades, thereby improving the cutting performance and durability of the stone cutting device.

Technical Solution

According to an aspect of the present disclosure, a stone cutting device may be configured to cut a workpiece with a plurality of cutting tools by swinging the cutting tools within a predetermined angle range, each of the cutting tools including a blade extending in a length direction of the workpiece, and at least one cutting tip disposed on an end of the blade and protruding from the blade in a width direction of the blade so as to cut the workpiece while being reciprocated in a swinging motion, and the stone cutting device including a frame unit configured to combine and reciprocate the cutting tools and individually adjust tension in each of the cutting tools, wherein the frame unit may include an actuator applying tension to the cutting tools so as to apply a load of 8 tons to 27 tons to each of the cutting tools.

The frame unit may include a body unit including a plurality of actuators respectively corresponding to the cutting tools, and the body unit may respectively couple the cutting tools to the actuators.

The workpiece may include granite.

According to another aspect of the present disclosure, a stone cutting device may be configured to cut a workpiece with a plurality of cutting tools by swinging the cutting tools within a predetermined angle range, each of the cutting tools including a blade extending in a length direction of the workpiece, and at least one cutting tip disposed on an end of the blade and protruding from the blade in a width direction of the blade so as to cut the workpiece while being reciprocated in a swinging motion, and the stone cutting device including: a frame unit configured to combine and reciprocate the cutting tools and individually adjust tension in each of the cutting tools; and spacers maintaining gaps between the cutting tools, the spacers constraining the cutting tools from moving in a width direction of the cutting tools and allowing the cutting tools to move in a length direction of the cutting tools.

According to another aspect of the present disclosure, a stone cutting device may be configured to cut a workpiece with a plurality of cutting tools by swinging the cutting tools within a predetermined angle range, each of the cutting tools including a blade extending in a length direction of the workpiece, and at least one cutting tip disposed on an end of the blade and protruding from the blade in a width direction of the blade so as to cut the workpiece while being reciprocated in a swinging motion, and the stone cutting device including: a frame unit configured to combine and reciprocate the cutting tools and individually adjust tension in each of the cutting tools; and spacers maintaining gaps between the cutting tools, the spacers constraining the cutting tools from moving in a width direction of the cutting tools and allowing the cutting tools to move in a length direction of the cutting tools, wherein the frame unit may include actuators applying tension to the cutting tools so as to apply a load of 8 tons to 27 tons to each of the cutting tools.

The spacers may include: bodies disposed between the cutting tools and integrally combined with both widthwise ends of the bodies being clamped; and accommodation portions provided on the bodies to receive the cutting tools.

The accommodation portions may include accommodation recess portions formed in sides of the bodies and corresponding to thicknesses of the cutting tools.

The accommodation portions may include jaw parts coupled to sides of the bodies and having thicknesses corresponding to thicknesses of the cutting tools.

A dimensional tolerance of gaps between the accommodation portions and the cutting tools may be −0.1 mm to 0.5 mm.

Advantageous Effects

According to the exemplary embodiments of the present disclosure, a high degree of tension may be applied to the cutting tools, and thus stone may be cut into high-quality slabs. In addition, according to the exemplary embodiments, the cutting tools including cutting tips may be properly operated, and the quality and rate of a stone cutting process may be improved by adjusting tension in the cutting tools. In addition, according to the exemplary embodiments, tension may be applied to the cutting tools intact, owing to the improved spacers. In addition, according to the exemplary embodiments, tension in each of the cutting tools may be individually adjusted, and a high degree of tension may be applied to the blades of the stone cutting device to which abrasive-containing cutting tips are attached. Therefore, deformation of the cutting tools may be minimized, and thus the stone cutting ability and durability of the cutting tools may be improved. In addition, the cutting tools may be less frequently replaced with new cutting tools, and thus the productivity of a stone cutting process may be increased without increasing maintenance and repair costs.

BEST MODE

Figure 1:
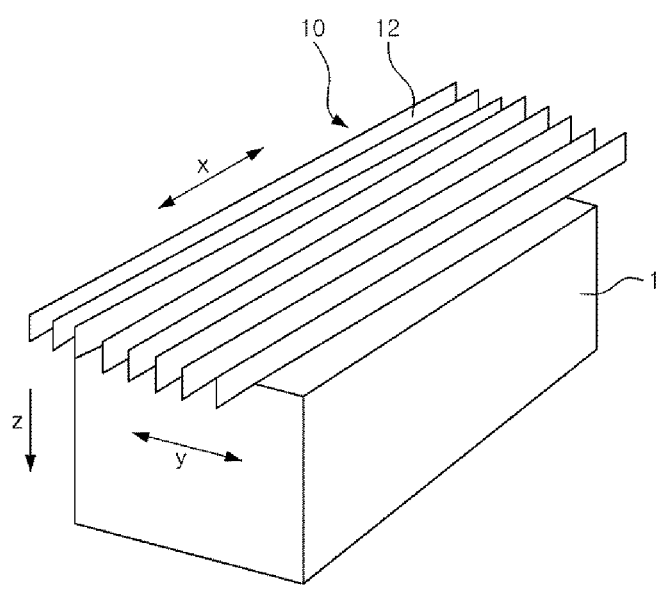
FIG. 1 is a schematic view illustrating a process of cutting a workpiece using a reciprocating-type stone cutting device including a plurality of blades.
Figure 2A:
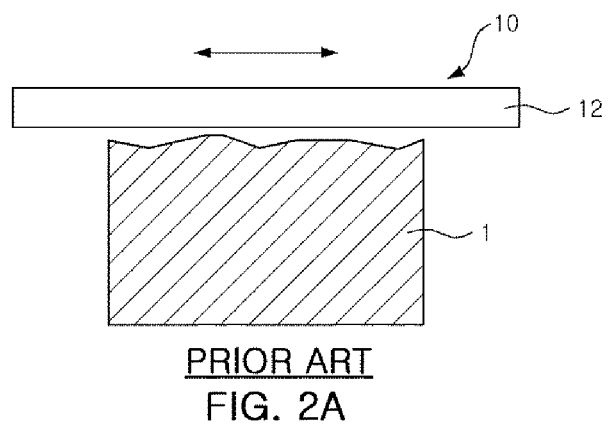
FIGS. 2A and 2B are a side view and a front view illustrating a process of cutting a workpiece with the stone cutting device.
Figure 2B:
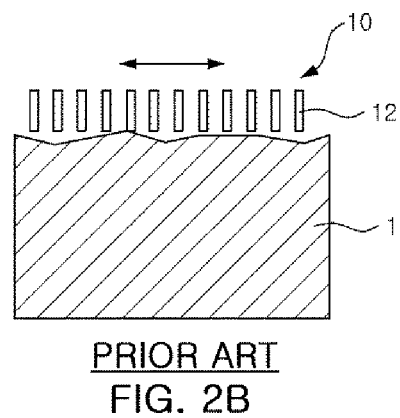
Figure 3A:
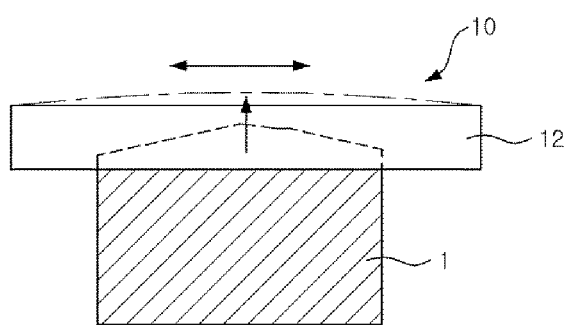
FIGS. 3A and 3B are schematic views illustrating how a cutting tool is deformed during a stone cutting process using the stone cutting device.
Figure 3B:
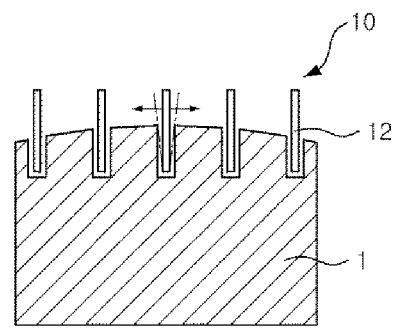
Figure 4A:
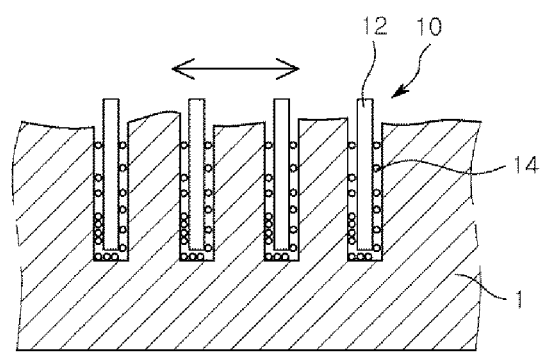
FIGS. 4A and 4B are cross-sectional views respectively illustrating a steel shot type cutting tool of a stone cutting device of the related art and a cutting tip type cutting tool of a stone cutting device of the related art.
Figure 4B:
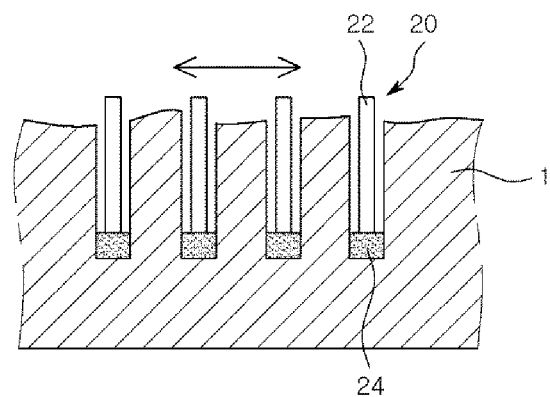
Figure 5:
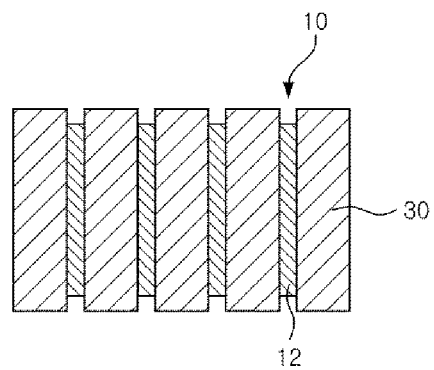
FIG. 5 is a cross-sectional view illustrating spacers of a cutting tool of a stone cutting device of the related art.

Exemplary embodiments of the present disclosure will now be described in detail with reference to the accompanying drawings. The disclosure may, however, be exemplified in many different forms and should not be construed as being limited to the specific embodiments set forth herein. In the drawings, the shapes and dimensions of elements may be exaggerated for clarity, and the same reference numerals will be used throughout to designate the same or like elements.

Figure 6:
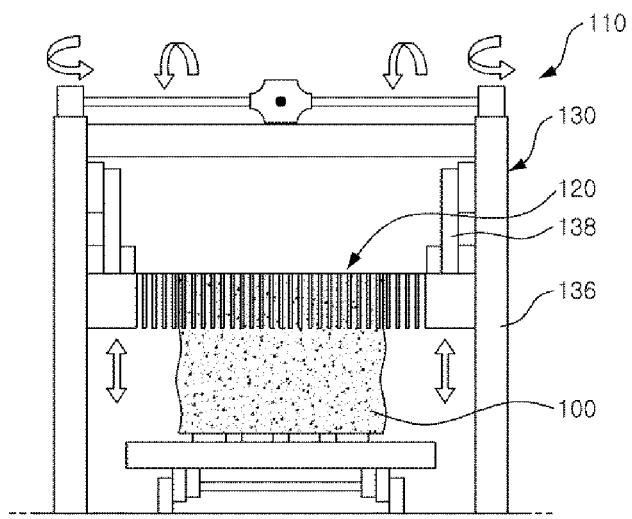
FIG. 6 is a cross-sectional view illustrating a stone cutting device according to an exemplary embodiment of the present disclosure.
Figure 7:
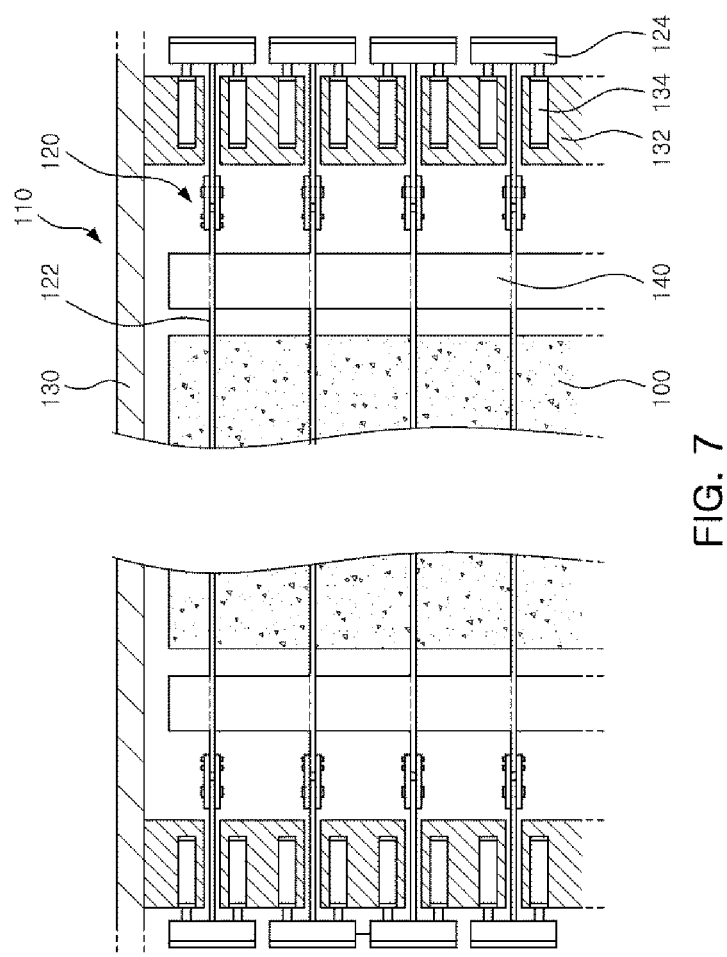
FIG. 7 is a plan view illustrating the stone cutting device according to the exemplary embodiment of the present disclosure.
Figure 8:
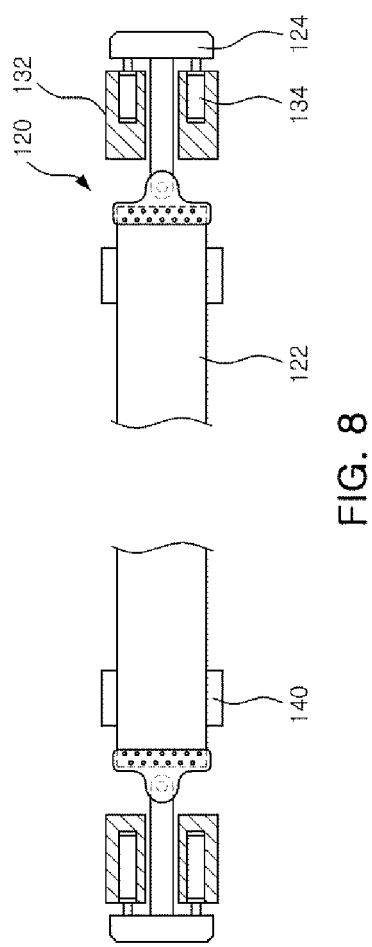
FIG. 8 is a side view illustrating a cutting tool of the stone cutting device according to the exemplary embodiment of the present disclosure.
Figure 9:
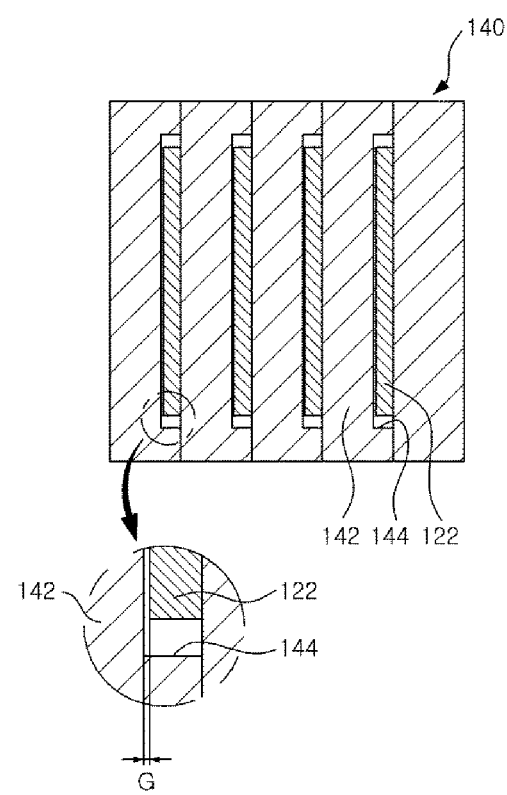
FIG. 9 is a cross-sectional view illustrating spacers disposed between cutting tools of the stone cutting device according to the exemplary embodiment of the present disclosure.

FIG. 6 is a cross-sectional view illustrating a stone cutting device 110 according to an exemplary embodiment of the present disclosure, FIG. 7 is a plan view illustrating the stone cutting device 110 according to the exemplary embodiment of the present disclosure, and FIG. 8 is a side view illustrating a cutting tool 120 of the stone cutting device 110 according to the exemplary embodiment of the present disclosure. FIG. 9 is a cross-sectional view illustrating spacers 140 disposed between cutting tools 120 of the stone cutting device 110 according to the exemplary embodiment of the present disclosure.

Referring to FIGS. 6 to 9, the stone cutting device 110 is configured to cut a workpiece 100 by reciprocating the cutting tools 120 between both sides of the workpiece 100 in the length direction of the workpiece 100 such that the cutting tools 120 may cut the workpiece 100 while contacting the workpiece 100.

A representative example of the stone cutting device 110 is a reciprocating-type multi-blade frame gang saw. In the current exemplary embodiment, the cutting tools 120 of the stone cutting device 110 may cut the workpiece 100 while swinging within a predetermined angle range.

The stone cutting device 110 of the current exemplary embodiment may include the cutting tools 120 extending in the length direction of the workpiece 100 and may be configured to cut the workpiece 100 while reciprocating along the workpiece 100. The cutting tools 120 may be coupled to a frame unit 130.

In the state in which the cutting tools 120 are coupled to the frame unit 130, the frame unit 130 may reciprocate the cutting tools 120 such that the cutting tools 120 may make contact with the workpiece 100 and cut the workpiece 100.

In addition, the frame unit 130 may individually adjust tension in each of the cutting tools 120.

The frame unit 130 may include at least one pair of pillars 136 set up at both sides of the workpiece 100. For example, the pillars 136 may be disposed in positions close to four corners of the workpiece 100.

In addition, arm units 138 capable of swinging within a predetermined angle range may be provided on the pillars 136. In addition, the arm units 138 may include bodies 132 combining the cutting tools 120.

In addition, the arm units 138 may be moved upwardly and downwardly. For example, the arm units 138 may be moved downwardly at a predetermined speed by a driving unit.

Owing to the arm units 138, when the workpiece 100 is cut with the cutting tools 120, the cutting tools 120 may be intermittently brought into contact with the workpiece 100 in association with the swinging motion of the cutting tools 120.

The bodies 132 may fix front and rear ends of the cutting tools 120 and may apply a constant degree of tension to the cutting tools 120. To this end, the bodies 132 may include a plurality of actuators 134 configured to apply tension to the cutting tools 120, respectively.

In the current exemplary embodiment, compared to actuators of the related art, the actuators 134 may apply a relatively high degree of tension to the cutting tools 120, for example, on the level of about 1,000 bars. To this end, the internal hydraulic pressure of the actuators 134 may be increased.

In the current exemplary embodiment, for example, the actuators 134 may apply tension to the cutting tools 120 so as to apply a load of about 8 tons to 15 tons to the cutting tools 120. If the internal hydraulic pressure of the actuators 134 is increased to 1,000 bars, a tension of about 27 tons may be applied to the cutting tools 120.

To this ends, high-strength hydraulic pipes may be used, or hydraulic pressure transmission areas may be increased. Furthermore, the frame unit 130 may be configured to have a durable structure and a high degree of strength, and a reinforcement structure may be further used, such that the frame unit 130 may endure the increase in the tension of the cutting tools 120.

There is a limit to increasing the diameters of the actuators 134 to increase the magnitude of loads that the bodies 132 can apply. The reason for this is that since the interval between blades 122 ranges from 15 mm to 30 mm, spaces for applying tension to the blades 122 are narrow. Therefore, instead of increasing the diameters of the actuators 134, the internal hydraulic pressure of the actuators 134 may be increased to increase the magnitude of loads that the actuators 134 can apply.

The cutting tools 120 may include the blades 122 extending in the length direction of the workpiece 100.

The blades 122 may be formed of a high-tensile steel sheet to sufficiently resist tension applied by the actuators 134, for example, on the level of about 27 tons. For example, if the blades 22 of the cutting tools 120 are vibrated at a rate of about 150 times per minute, it may take 40 hours for the blades 122 to cut about 2 m of granite, and if it is assumed that the blades 122 are usable up to about 20 times, the blades 122 may be subjected to high cycle fatigue ($10^6$ cycles to $10^7$ cycles)

That is, the blades 122 have to endure such high cycle fatigue environments without breakage. In addition, deformation may be locally concentrated in cutting tips of the blades 122. Therefore, dimensions and steel for forming the blades 22 may be selected in consideration of a safety factor so that the blades 22 may resist the pressures of such environments.

For example, blades of cutting tools using steel shot may have a thickness of 4 mm and a height of 100 mm, and steel having a tensile strength of about 85 kg/mm$^2$ may be used to form the blades. If it is assumed that the fatigue strength of the blades is about 40% of the tensile strength of the blades, and a safety factor of 0.8 is applied, the blades may be resistant to tension causing a load of about 110 kN, that is, about 11 tons.

In the current exemplary embodiment, at least one cutting tip may be provided on each of the blades 122 of the cutting tools 120 so as to increase cutting force and the rate of cutting. In this case, cutting may be substantially carried out by the cutting tips without using steel shots.

For example, the cutting tips may be coupled to ends of the blades 122 and may be thicker than the blades 122. That is, the cutting tips may protrude from the blades 122 in the width direction of the blades 122. In this state, the cutting tips may be brought into contact with the workpiece 100 to cut the workpiece 100.

As described above, the blades 122 having the cutting tips may have a thickness of 3.5 mm and a height of 180 mm and may be formed of steel having a tensile strength of 1,300 kg/mm$^2$.

In the current exemplary embodiment, cutting is substantially performed by the cutting tips of the blades 122, and thus the blades 122 may be formed of material having tensile strength higher than that used to form blades of cutting tools that use steel shots. That is, the blades 122 may be formed of high-tensile steel, and thus the blades 122 may be relatively thin.

In the current exemplary embodiment, if it is assumed that the fatigue strength of the blades 122 is about 40% of the tensile strength of the blades 122, and a safety factor of 0.8 is applied, the blades 122 may be resistant to tension causing a load of about 266 kN, that is, about 27 tons.

Furthermore, in the current exemplary embodiment, since the maximum load that the blades 122 of the cutting tools 120 can endure is increased, it may be preferable that the blades 122 have a height of about 180 mm.

If the heights of the blades 122 are increased, the degree of tension that the blades 122 can endure may be affected. Blades using steel shot and having the same height as the blades 122 may endure tension causing a force or load of about 196 kN, that is, 20 tons. That is, blades using steel shot and having the same dimensions as the blades 122 may endure a load which is lower by about 35% than a load that the blades 122 using the cutting tips can endure. In general, blades may endure a greater load if the dimensions of the blades, such as the height, are increased. In this case, however, the weight and size of an entire system may increase, and thus there is a limit to increasing the dimension of blades.

Therefore, blades of a frame gang saw using cutting tips may be formed of high-tensile steel to increase an amount of tension that the blades can endure.

For example, the actuators 134 may apply about 300 bars of tension to the blades 122 under conventional operating conditions, which may cause a load of about 8 tons to about 10 tons. If the tension applied from the actuators 134 to the blades 122 is doubled to about 600 bars, the blades 122 may generate a load of about 16 tons to about 20 tons.

Under these conditions, conventional blades using steel shots may fracture because the conventional blades are not able to endure a load of about 20 tons (about 11 tons if the fatigue strength and safety factor of the conventional blades are considered).

According to the current exemplary embodiment, however, the blades 122 including the cutting tips are able to endure a load of about 27 tons when the fatigue strength and safety factor of the blades 122 are considered. That is, although the amount of tension applied by the actuators 134 is tripled to about 900 bars, the blades 122 may not fracture.

In addition, if the heights of the blades 122 including the cutting tips are increased to a range of about 250 mm to about 300 mm, the blades 122 may endure up to about 1300 bars of tension applied by the actuators 134.

In addition, the cutting tools 120 may include extension members 124 to transmit tension applied by the actuators 134. The extension members 124 may be connected to transmit tension from the actuators 134 to the blades 122.

In addition, the spacers 140 may be disposed between the blades 122 of the cutting tools 120, and thus the blades 122 coupled to the frame unit 130 may be maintained at regular intervals.

In the current exemplary embodiment, the spacers 140 may constrain the movement of the blades 122 in the width direction of the blades 122 but may allow for the movement of the blades 122 in the length direction of the blades 122. Therefore, owing to this constraint of the blades 122 in the width direction, the blades 122 may not undergo deformation such as bending or twisting.

In addition, since the blades 122 are allowed to move in the length direction thereof, the magnitude of tension of each of the blades 122 may be individually adjusted.

That is, in the current exemplary embodiment, the blades 122 of the cutting tools 120 that actually receive tension are constrained in the width thereof by the spacers 140 but are allowed to move in the length direction thereof. Therefore, a high degree of tension may be applied to the blades 122.

If a high degree of tension is applied to the blades 122, the resilience of the blades 122 may increase, and thus the workpiece 100 may be cut with low thickness deviation and high cutting quality.

Both widthwise ends of the spacers 140 may be held by clamps so that the spacers 140 may be combined while holding the blades 122.

The spacers 140 may include bodies 142 disposed on sides of the blades 122, and the bodies 142 may include accommodation portions. When the spacers 140 are combined, the accommodation portions may accommodate the cutting tools 120, that is, the blades 122 extending in the length direction of the cutting tools 120, in a state in which the blades 122 are constrained from moving in the width direction thereof but allowed to move in the length direction thereof.

In the current exemplary embodiment, the accommodation portions may include accommodation recess portions 144 formed in sides of the bodies 142 and having a depth corresponding to the thickness of the blades 122.

The spacers 140 are combined in such a manner that a portion of a body 142 located around the accommodation recess portion 144 of the body 142 is supported by a rear side of another body 142. Therefore, the blades 122 inserted into the accommodation recess portions 144 may be constrained from moving in the width direction thereof. In addition, since the bodies 142 are arranged in such a manner that a body 142 is supported by the rear side of another body 142, the bodies 142 do not press the blades 122 in the width direction of the blades 122 and do not constrain the blades 122 in the length direction of the blades 122.

To this end, gaps may be formed between the accommodation recess portions 144 of the bodies 142 and the blades 122.

For example, a dimensional tolerance between the accommodation recess portions 144 and the blades 122 may be from −0.1 mm to 0.5 mm.

If the dimensional tolerance between the accommodation recess portions 144 and the blades 122 is greater than 0.5 mm, the blades 122 may not be stably constrained.

Although it is preferable that the dimensional tolerance between the accommodation recess portions 144 and the blades 122 is greater than 0 mm, the dimensional tolerance may have a value up to −0.1 mm due to an allowable error of tension applied to the blades 122. That is, if the dimensional tolerance between the accommodation recess portions 144 and the blades 122 is 0 mm, the blades 122 may not be constrained by the spacers 140, and thus tension applied by the actuators 134 may be transmitted to the blades 122 intact. If the dimensional tolerance between the accommodation recess portions 144 and the blades 122 is less than 0 mm, the blades 122 may be somewhat constrained by the spacers 140, and thus tension may not be completely transmitted to the blades 122. However, even in this case, if the dimensional tolerance between the accommodation recess portions 144 and the blades 122 is −0.1 mm or greater, sufficient tension may be applied to the blades 122.

In the current exemplary embodiment, the accommodation portions of the spacers 140 may have any other structure instead of having the accommodation recess portions 144.

Figure 10A:
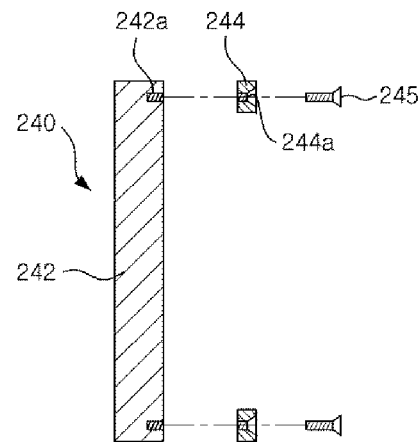
FIGS. 10A and 10B are cross-sectional views illustrating a modification of the spacers disposed between the cutting tools of the stone cutting device, according to another exemplary embodiment of the present disclosure.
Figure 10B:
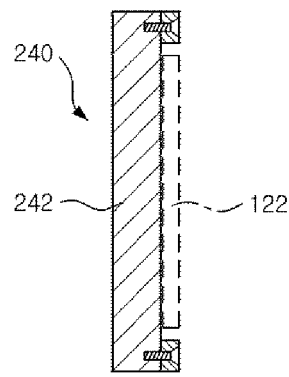

FIGS. 10A and 10B are cross-sectional views illustrating a modification of the spacers 140 disposed between the cutting tools 120 of the stone cutting device 110 according to another exemplary embodiment of the present disclosure.

Referring to FIGS. 10A and 10B, in the this exemplary embodiment, a spacer 240 may include a body 242, and jaw parts 244 corresponding to the thickness of the blade 122 may be coupled to the body 242.

Sides of the jaw parts 244 may be coupled to a side of the body 242 such that the jaw parts 244 may be disposed above and below the blade 122. In addition, other sides of the jaw parts 244 may be supported by a side of another body 242 (not shown) clamped to the body 242.

The jaw parts 244 may be coupled to the body 242 using fasteners such as bolts 245, and the body 242 may include coupling holes 242a to receive the bolts 245 inserted through penetration holes 244a of the jaw parts 244.

Stone may be cut with the stone cutting device 110 as follows. FIGS. 11A to 11D are graphs illustrating the thicknesses of cut workpieces with respect to degrees of tension in the blades 122 of the stone cutting device 110 according to examples.

First, a stone workpiece is placed in the stone cutting device 110. The cutting tools 120 are coupled to the stone cutting device 110 in the length direction of the stone workpiece. The cutting tools 120 are integrally combined with each other using clamps with the spacers 140 being disposed therebetween.

MODE FOR INVENTION

Example 1

In Example 1, spacers were disposed between cutting tools, and the cutting tools were clamped together with the spacers. Thus, tension in the cutting tools could not be adjusted.

If excessive tension is applied to the cutting tools, some of the cutting tools may fracture because of excessive tension, and the remainder of the cutting tools may undergo deformation such as bending due to insufficient tension.

Figure 11A:
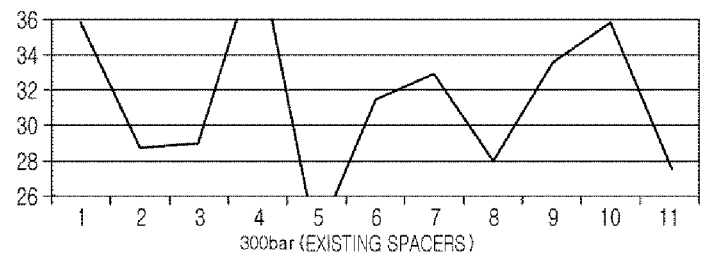
FIGS. 11A to 11D are graphs illustrating the thicknesses of cut workpieces with respect to degrees of tension in blades of the stone cutting device according to examples.

FIG. 11A is a graph illustrating thicknesses of cut workpieces with respect to tension in blades in Example 1.

As illustrated in FIG. 11A, the hydraulic pressure of actuators of a stone cutting device was about 300 bars, and a tension of about 7.5 tons was applied to the blades.

When stone was cut under these conditions of Example 1, a high thickness deviation was observed.

Example 2

In Example 2, the hydraulic pressure of actuators was about 300 bars as in Example 1, and a tension of about 7.5 tons was applied to blades of cutting tools.

The spacers described in the exemplary embodiment of the present disclosure were coupled between the blades. The spacers maintained gaps between the blades without restricting tension applied to the blades, and thus tension could be distributed in the blades of a stone cutting device intact. That is, although tension applied by the stone cutting device was not increased, the effect of increasing tension in the blades could be obtained.

Figure 11B:
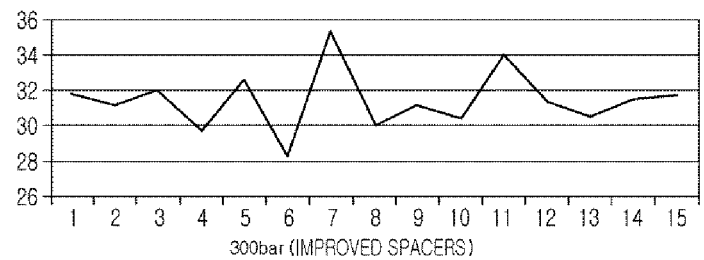

FIG. 11B is a graph illustrating the thicknesses of cut workpieces with respect to tension in the blades in Example 2.

As illustrated in FIG. 11B, when stone was cut under the above-described conditions of Example 2, thickness deviation was lower than in Example 1.

In Example 2, the blades of the cutting tools were not completely constrained by the spacers, and thus tension could be applied to the blades intact. Therefore, when stone was cut into slabs using the cutting tools, tension could be applied to the cutting tools without loss, and thus the thickness deviation of slabs was reduced.

In the stone cutting device, however, the cutting tools and the spacers were tightly coupled together, and thus the degree of tension in each of the cutting tools could not be individually adjusted. In Example 2, if an amount of tension higher than the above-mentioned value is applied, the possibility of blades fracturing may increase, and workability may not improve.

Example 3

In example 3, the stone cutting device of the exemplary embodiment of the present disclosure was used while applying a degree of tension greater than the above-mentioned degree of tension by about 100%. That is, the hydraulic pressure of the improved actuators was about 600 bars in Example 3.

Figure 11C:
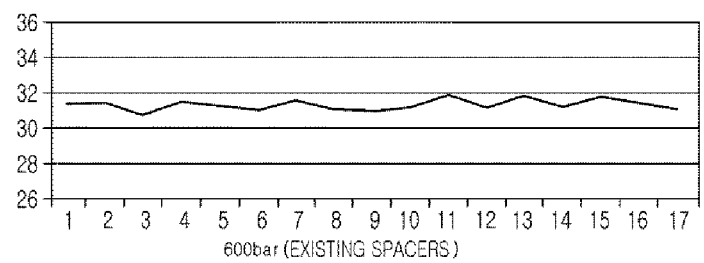

FIG. 11C is a graph illustrating the thicknesses of cut workpieces with respect to tension in the blades according to Example 3.

As illustrated in FIG. 11C, the hydraulic pressure applied to the blades was increased to about 600 bars during a stone cutting process. In this case, a degree of tension of about 15 tons was applied to the blades.

In the stone cutting device, as tension in the blades of cutting tools increased, the thickness deviation of cut workpieces decreased.

Example 4

In Example 4, the stone cutting device of the exemplary embodiment of the present disclosure including spacers between the cutting tools was used. The cutting tools were clamped in such a manner that the cutting tools were constrained from moving in the width direction thereof by the spacers while being allowed to move in the length direction thereof.

Therefore, tension in each of the cutting tools could be individually adjusted by taking the states of the blades of the cutting tools into consideration, and thus tension in the blades was not insufficient or excessive.

In Example 4, about 600 bars of hydraulic pressure was applied to the blades during a stone cutting process. In this case, the blades were constrained from moving in the width direction of the blades, and tension was applied from the improved actuators to the blades intact. Thus, tension in the blades was about 15 tons.

Figure 11D:
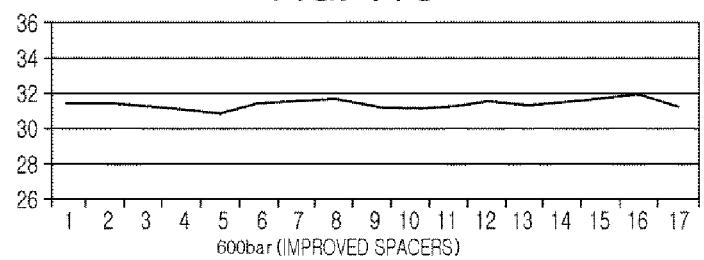

FIG. 11D is a graph illustrating the thicknesses of cut workpieces with respect to tension in the blades in Example 4.

As illustrated in FIG. 11D, in Example 4, when a hydraulic pressure of about 600 bars was applied to the cutting tools, tension in each of the blades could be individually adjusted. Thus, stone workpieces could be cut in a state in which high tension was applied to the blades. In addition, since tension in each of the cutting tools could be individually adjusted, the cutting tools were not easily fractured, and thus stone workpieces could be cut with low thickness deviation.

While exemplary embodiments have been shown and described above, it will be apparent to those skilled in the art that modifications and variations could be made without departing from the scope of the present invention as defined by the appended claims.

The invention claimed is:

1. A stone cutting device configured to cut a workpiece, the stone cutting device comprising:
   a plurality of cutting tools that cut the workpiece by swinging within a predetermined angle range, each of the cutting tools comprising a blade extending in a length direction of the workpiece, and at least one cutting tip disposed on an end of the blade and protruding from the blade in a width direction of the blade so as to cut the workpiece while being reciprocated in a swinging motion; and
   a frame unit configured to combine and reciprocate the cutting tools and individually adjust tension in each of the cutting tools,
   wherein the frame unit comprises an actuator applying tension to the cutting tools so as to apply a load of 8 tons to 27 tons to each of the cutting tools, and
   wherein the actuator has at least one high-strength hydraulic pipe or an increased hydraulic pressure transmission area to endure the tension of the cutting tools while maintaining an interval between blades of the cutting tools ranging from 15 millimeters to 30 millimeters.

2. The stone cutting device of claim 1, wherein the frame unit comprises a body unit comprising a plurality of actuators respectively corresponding to the cutting tools, and the body unit respectively couples the cutting tools to the actuators.

3. The stone cutting device of claim 1, wherein the workpiece comprises granite.

4. The stone cutting device of claim 1, wherein the stone cutting device comprises spacers maintaining gaps between the cutting tools, the spacers constraining the cutting tools from moving in a width direction of the cutting tools and allowing the cutting tools to move in a length direction of the cutting tools.

5. A stone cutting device configured to cut a workpiece with a plurality of cutting tools by swinging the cutting tools within a predetermined angle range, each of the cutting tools comprising a blade extending in a length direction of the workpiece, and at least one cutting tip disposed on an end of the blade and protruding from the blade in a width direction of the blade so as to cut the workpiece while being reciprocated in a swinging motion, the stone cutting device comprising:
- a frame unit configured to combine and reciprocate the cutting tools and individually adjust tension in each of the cutting tools; and
- spacers maintaining gaps between the cutting tools, the spacers having bodies disposed between the cutting tools and integrally combined with both widthwise ends of the bodies being clamped, the bodies including accommodation portions to receive the cutting tools, the accommodation portions having accommodation recess portions formed in sides of the bodies and having a depth corresponding to a thickness of the blades,
- wherein the gaps are formed in the spacers between the accommodation recess portions of the bodies and the blades, the spacers constraining the cutting tools from moving in a width direction of the cutting tools and allowing the cutting tools to move in a length direction of the cutting tools.

6. The stone cutting device of claim 5, wherein the accommodation portions comprise jaw parts coupled to sides of the bodies and having thicknesses corresponding to thicknesses of the cutting tools.

7. The stone cutting device of claim 5, wherein the frame unit comprises actuators applying tension to the cutting tools so as to apply a load of 8 tons to 27 tons to each of the cutting tools.

* * * * *